United States Patent Office 2,933,504
Patented Apr. 19, 1960

2,933,504
DERIVATIVES OF POLYALKOXYCARBONYL IMINE

Hein L. Klopping, Wilmington, Del., assignor to E. I. du Pont de Nemours and Company, Wilmington, Del., a corporation of Delaware No Drawing. Application August 10, 1959
Serial No. 832,422

5 Claims. (Cl. 260—309.2)

This invention relates to esters of aminobenzimidazole-carboxylic acids and their salts and chelates. This application is a continuation-in-part of my applications Serial No. 714,690, filed February 2, 1958, and Serial No. 722,632, filed March 20, 1958, both copending herewith but now abandoned.

It has been found that compounds represented by the following formula possess outstanding fungicidal activity:

FORMULA I

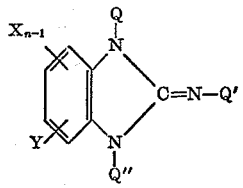

wherein X is selected from the group consisting of hydrogen, halogen, nitro, alkyl groups containing 1 through 6 carbon atoms and alkoxy groups containing 1 through 6 carbon atoms; $n$ is a whole positive integer less than 5, that is 1, 2, 3, or 4; Y is selected from the group consisting of hydrogen, chlorine, methyl and ethyl; the Q's can be the same or different and are selected from the group consisting of hydrogen, —COOR, —COOR′ and —COOR″ and M, with the proviso that not more than one Q is M and at least two Q's are alkoxy carbonyl groups; M is a cation that forms a salt or chelate with the esters; R, R′ and R″ are the same or different aliphatic radicals containing from 1 through 5 carbon atoms.

Preferably M is selected from the group consisting of simple metal ions, complexed metal ions capable of additional coordination, and nitrogenous bases having a basicity constant greater than $10^{-5}$. Suitable simple metal ions include ferrous, ferric, manganese, zinc, nickel, chromium, cobalt, cuprous, cupric, calcium, barium, aluminum, magnesium, silver, sodium and potassium. Complexed metal ions capable of additional coordination include species such as partially hydrated metal ions, i.e., $[Ni(H_2O)_4]^{++}$, $[Cu(H_2O)_2]^{++}$, $[Mn(H_2O)_2]^{++}$; basic metal ions, i.e., $[Cu(OH)]^+$, $[Cr(OH)]^{++}$, $[Al(OH)]^{++}$, $[Zn(OH)]^+$ metal ions containing other coordinated groups, i.e., $[Zn(NH_3)_2]^{++}$, $[Co(ethylenediamine)]^{+++}$, $[Fe(C_2O_4)]^+$ and combinations of the above, i.e., $[Cu(OH)(H_2O)]^+$, $[Fe(C_2O_4)(H_2O)_2]^+$, $[Co(CO_3)(H_2O)_2]^+$, $[Cr(OH)(H_2O)]^{++}$ $[Cu(H_2O)(dimethylformamide)]^{++}$. Nitrogenous bases having a basicity constant greater than $10^{-5}$ include ammonia, alkyl substituted ammonium, ethylenediamine, piperidine, benzylamine, etc. It should be understood that the species described above are in the form in which they exist (as the product) in combination with the amino benzimidazole carboxylic acid esters, and not necessarily the species used in the preparation of the products.

R, an aliphatic hydrocarbon radical of less than 6 carbon atoms, can be an alkyl such as methyl, ethyl, beta-chloroethyl, hydroxyethyl, propyl, butyl, isopropyl, amyl and n-hexyl. Alternatively, R can be an alkenyl, such as vinyl, allyl, and butenyl, or alkinyl such as propargyl.

It will be understood that the above structure may exist in two tautomeric forms when at least one Q is hydrogen.

FORMULA II

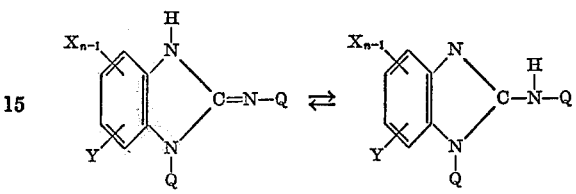

The compounds of the present invention may be prepared by a number of routes. For example, the 1,3-substituted diesters and the triesters of Formula I can be prepared by reacting a 2-aminobenzimidazole, an alkyl chloroformate and an acid acceptor in accordance with the following sequence of reactions (Scheme I):

Scheme I

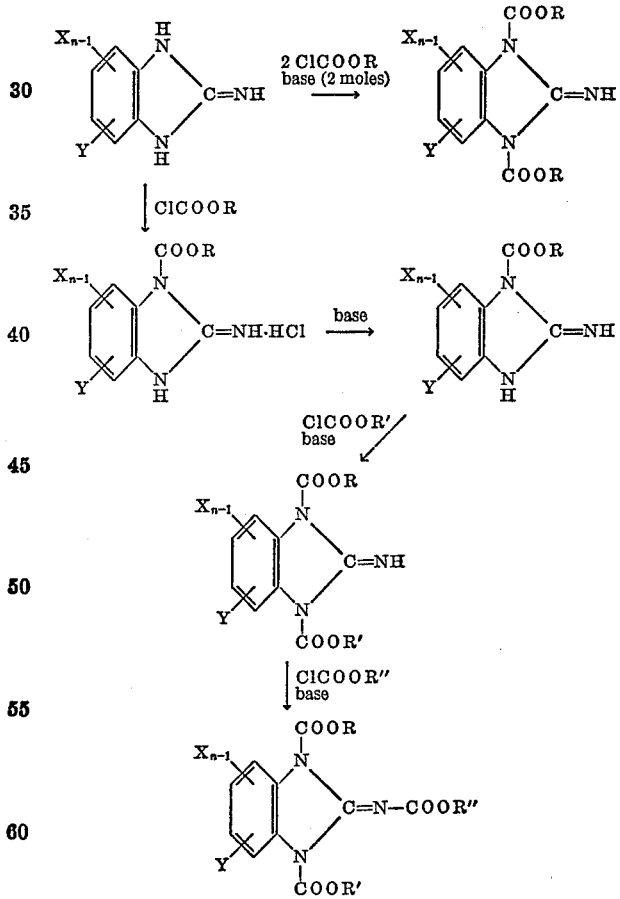

In this scheme, X, Y, $n$, R, R′ and R″ are as described as in Formula I.

The reactions of Scheme I may be carried out in a great many different solvents such as water, acetone, methanol, ethanol, chloroform, dioxane, dimethylformamide and many others. Mixtures of these solvents can also be used, e.g., aqueous acetone or a mixture of chloroform and water. These mixtures are particularly suitable in cases where the base used in soluble only in water, Suitable bases are sodium hydroxide, sodium acetate, sodium carbonate, potassium carbonate, sodium bicarbonate, trimethylamine, triethylamine, pyridine and many others. These bases may be used either as such or in the form of a solution in a suitable solvent.

The reaction temperature is in general not critical, and may be anywhere in between the freezing point and the boiling point of the reaction mixture, provided this boiling point is below the temperature at which reactants and products decompose. As is well known, alkyl chloroformates tend to decompose in certain solvents such as dimethylformamide at room temperature and above. Accordingly, when dimethylformamide is being used, cooling to a temperature in the neighborhood of 10° C. or less helps avoid undue losses of alkyl chloroformate. Likewise, alkyl chloroformates are relatively unstable in hot water, particularly under basic conditions.

As illustrated by Scheme I, the compounds of this invention in most cases may be prepared either in the absence or in the presence of a base. In the former case, where chemically possible, the hydrochlorides of the products are obtained, which can be subsequently neutralized; in the latter case the free esters form. It is also possible to add the alkyl chloroformate and the base, either as such or in solution or suspension, simultaneously to a stirred solution or suspension of the appropriate 2-aminobenzimidazole. Because of the ease and rapidity with which these reactions take place, they can be carried out continuously, in a pipe reactor, by the simultaneous addition of alkyl chloroformate and base.

The 1,2-substituted diesters, as well as the triesters of Formula I are conveniently prepared by a route which uses the 2-substituted monoesters as the key intermediates. This route is illustrated by Scheme II:

Scheme II $$H_2N-\underset{\underset{S}{\|}}{C}-NH_2 + \tfrac{1}{2}(CH_3)_2SO_4 \longrightarrow H_2N-\underset{\underset{SCH_3}{|}}{C}=NH \cdot \tfrac{1}{2}H_2SO_4$$

$$H_2N-\underset{\underset{SCH_3}{|}}{C}=NH \cdot \tfrac{1}{2}H_2SO_4 + 2ClCOOR \xrightarrow{base} ROOC-\underset{\underset{SCH_3}{|}}{N}-\overset{H}{\underset{}{C}}=N-COOR$$

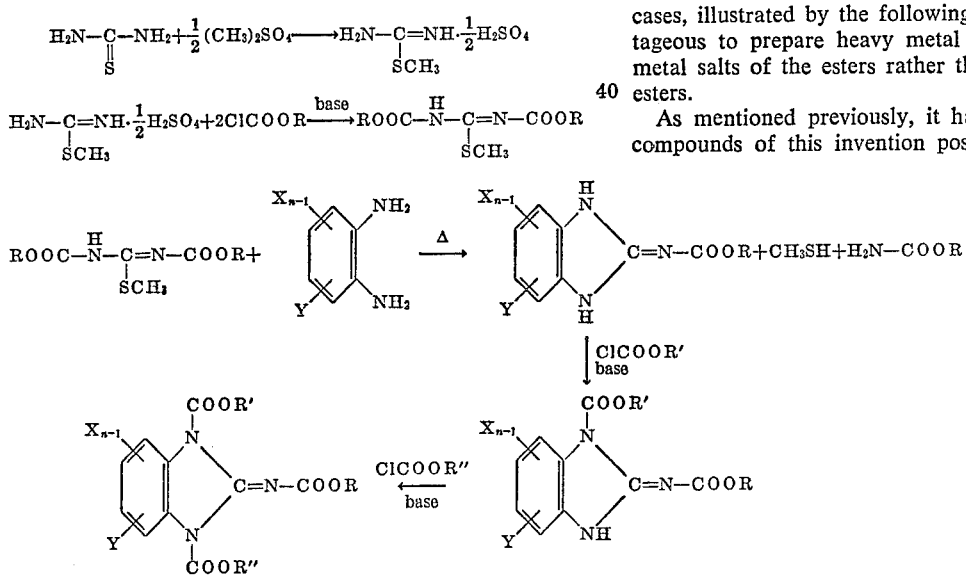

In this scheme X, Y, n, R, R' and R'' are the same as in Formula I.

The reaction conditions used in the preparation of a variety of compounds of this invention are described in the examples which follow.

The preparation of the 1,2-substituted diesters of this invention from the 2-substituted monoesters can be carried out in different solvents such as acetone or chloroform. Generally, any solvent can be used in which the monoester is sufficiently soluble to enter into the reaction, and which does not decompose or react with either the starting materials or the product under the particular set of reaction conditions used. For example, if an alcohol such as methanol or ethanol is used, care should be taken to keep the temperature of the reaction mixture sufficiently low so as to avoid reaction of the alkyl chloroformate with the solvent. If, for example, carbon tetrachloride is used as the solvent, it is advantageous to raise the temperature of the reaction mixture somewhat, say to 60° C., as the monoesters generally have very low solubility in this solvent. The temperature of the reaction mixture may be anywhere in between the freezing point and the boiling point of the reaction mixture, provided again that no conditions are chosen which are deleterious to either starting materials or product. From the standpoints of both cost and ease of operation, it is advantageous to carry out this reaction at around room temperature.

The reaction may be carried out either in the absence or in the presence of an acid acceptor. If carried out in the absence of an acid acceptor, the hydrochloride of the product is obtained which may subsequently be neutralized by the addition of an acid acceptor, either in situ or after isolation. From the standpoints of both cost and ease of operation, it is advantageous to carry out the reaction in the presence of a base, which may be added as such or in the form of an aqueous suspension or solution. The base may be added at the start of the reaction or simultaneously with the alkyl chloroformate. Care should be taken to avoid conditions where the disubstituted product is in contact with an excess of strongly basic acid acceptors, as under these conditions decomposition of the diester with formation of the 2-monosubstituted starting material may occur. Therefore, it is advantageous (but not necessary) to avoid the use of strongly basic materials such as alkali metal hydroxides and tertiary amines.

The metal chelates represented by Formula I are prepared readily from the corresponding organic molecules by dissolving the appropriate ester and the desired cation separately in suitable solvents, mixing the solutions in appropriate molecular proportions, and isolating the metal derivative formed by filtration or evaporation. In certain cases, illustrated by the following examples, it is advantageous to prepare heavy metal chelates via the alkali metal salts of the esters rather than directly from these esters.

As mentioned previously, it has been found that the compounds of this invention possess outstanding fungicidal activity, controlling a wide variety of fungus diseases of plants without damaging the host.

Also, certain of these compounds have exhibited systemic fungicidal activity, a unique type of activity that heretofore has been found in almost no other compounds. Because of this systemic activity, fungicidal control of a plant is prolonged in comparison to that obtained with non-systemic fungicides. As a result, the active fungicidal compounds need be applied much less frequently. This is a result of the absorption of the fungicidal compound by the plant and the resulting translocation of active material to newly grown areas. In this same manner, areas of the plant that did not come into contact with the fungicidal compound because of the lack of complete coverage obtained with mechanical equipment, are protected.

The compounds of this invention can be used as fungicides by applying one or more of the active ingredients to the organic material to be treated for the control of fungi at a dosage sufficient to exert fungicidal action. Accordingly, they are applicable for the protection of carbohydrates, proteins and fats. They are particularly suited for the treating of plants such as vegetables, ornamental and fruit-bearing trees. Some of these compounds are also effective when applied directly to the soil for controlling soil-borne pathogenic plant fungi. Also they can be used to treat organic fibers and fabrics, leather and various cellulosic materials such as wood. Likewise they can be used to treat paints and lubricating oils.

In application to plants, fungus control is obtained in most instances by spraying the active compound in a suiable fungicidal composition on the plants in a concentration of from 0.05 to 0.50% active ingredient in the spray. The optimum amount within this range is largely dependent upon the well-known variables such as the particular fungicidal compound selected, the method of application, and, in the case of application to vegetation, the state and condition of growth of the vegetation to be treated, and the climatic conditions.

The fungicidal compositions of the invention contain in sufficient amount to exert fungicidal action one or more of the above-described active compounds in admixture with a carrier material or conditioning agent of the kind used and commonly referred to in the art as a fungicide adjuvant or modifier. The conventional fungicide adjuvants are inert solids, hydrocarbon liquid diluents and surface-active agents. The provide formulations adapted for ready and efficient application using conventional applicator equipment. Usually from about 1–95% by weight of the fungicidal composition is active ingredient.

Solid compositions are preferably in the form of powders. They are compounded as homogeneous powders that can be either used as such, diluted with inert solids to form dusts, or suspended in a suitable liquid medium for spray application. The powders usually comprise active ingredient admixed with minor amounts of conditioning agent. Natural clays, either adsorptive such as attapulgite or relatively non-adsorptive such as kaolin clays can be used. Diatomaceous earth, walnut shell flour, tobacco dust, redwood flour, synthetic fine silica and other inert solid carriers of the kind conventionally employed in powder fungicidal compositions can also be used. The active ingredient usually makes up from about 25–90% of these powder compositions. For conversion of the powders to dusts, talc, pyrophyllite, tobacco dust, volcanic ash and other dense, rapid-settling inert solids customarily are used.

Liquid compositions employing one or more of the fungicidally-active ingredients are prepared by admixing the active ingredient with a suitable liquid diluent medium. The active ingredient can be either in solution or in suspension in the liquid medium. Typical of the liquid media commonly employed as fungicide adjuvants are water, kerosene, Stoddard solvent, xylene, alcohols, alkylated naphthalene and glycols. The active ingredient usually makes up from about 0.5 to 50% of these liquid compositions. Some of these compositions are designed to be used as such, and others to be extended with large quantities of water.

Compositions in the form of wettable powders or liquids in many cases also include one or more surface-active agents such as wetting, dispersing or emulsifying agents. These materials cause the compositions to disperse or emulsify easily in water to give aqueous sprays.

The surface-active agents employed can be of the anionic, cationic or nonionic type. They include, for example, sodium oleate, sulfonated petroleum oils, alkyl aryl sulfonates, sodium lauryl sulfate, polyethylene oxide modified fatty esters, lignin sulfonates, and other surface-active agents. A detailed list of such agents is set forth in an article by McCutcheon in "Soap and Chemical Specialties," volume 31, Nos. 7–10 (1955).

In some cases it may be desirable to employ the active compounds of the present invention in combination with other fungicides to give compositions that have broad spectrum fungicidal activity. In these mixtures, the fungicidaly active materials can be present in any desired amount, ordinarily from about 0.1–20 parts by weight of a compound represented by Formula I per part by weight of the auxiliary fungicidaly active material. In some instances it may even be desirable to employ two or more auxiliary fungicides.

Typical of the auxiliary fungicide that can be employed in combination with the compounds of the present invention the the following:

N-trichloro-methylthio-4-cyclohexene-1,2-dicarboximide
Tetramethylthiuram disulfide
Manganese ethylene-bis-dithiocarbamate
Ferric dimethyl dithiocarbamate
Zinc ethylene-bis-dithiocarbamate
Zinc dimethyl dithiocarbamate (ziram)
Tetra copper calcium oxychloride
Tetrachloro-p-benzoquinone (chloranil)
2,3-dichloro-1,4-naphthoquinone (dichlone)
2,4-dichloro-6-(o-chloroanilino)triazine (dyrene)
Ethylene thiuram monosulfide
2-heptadecyl glyoxalidine acetate (glyodin)
Ferric dimethyl dithiocarbamate plus 2-mercaptobenzothiazole
Manganese dimethyl dithiocarbamate plus 2-mercaptobenzothiazole
Copper dihydrazinium sulfate
Copper-8-quinolinolate
Cycloheximide In order that the invention may better understood, the following examples are given in addition to those already set forth above:

EXAMPLE 1

*Preparation of 2-imino-1,3-benzimidazoline dicarboxylic acid, dimethyl ester*

To a solution of 120 grams (0.9 mole) of 2-aminobenzimidazole in 1700 ml. of acetone are added 90 grams (6% excess over 0.9 mole) of methylchloroformate while stirring over a period of 2¾ hours. The temperature is kept at 35° by external heating. After stirring for one additional hour, the mixture is filtered with suction. The solid is washed with acetone and dried. The white crystalline solid weighs 197 grams (97%), m.p. 140–142° dec.

The above material is dissolved in 750 ml. of water. While stirring, a 10% aqueous sodium hydroxide solution is added in a thin stream until a pH of 8.5 is reached. The mixture is filtered with suction; the solid is washed with water and dried. The product, which melts at 163–164° dec., consists of pure 2-amino-1-benzimidazole carboxylic acid, methyl ester.

*Analysis.*—Calcd. for $C_9H_9N_3O_2$: C, 56.5; H, 4.75; N, 22.0. Found: C, 56.78; H, 4.98; N, 22.03.

A mixture of 7.3 grams (0.0382 mole) of the above ester, 120 ml. of chloroform, 3.3 grams (0.039 mole) sodium bicarbonate and 10 ml. of water is stirred and kept at 10° C. by external cooling. Then, 4.0 grams (10% excess over 0.0382 mole) of methyl chloroformate are added over a period of 1¼ hours. Stirring is continued for one hour. The two clear phases are separated, and the chloroform layer is dried over anhydrous $Na_2SO_4$ and evaporated in a vacuum. The solid residue weighs 9.0 grams (95%) and metals at 97–105° C. After recrystallization from carbon tetrachloride, the product melts at 108.5–110°.

*Analysis.*—Calcd. for $C_{11}H_{11}N_3O_4$: C, 53.0; H, 4.45; N, 16.9. Found: C, 53.18; H, 4.50; N, 16.81.

The infrared spectrum of this compound supports the assigned structure and contains no —CO—NH-peak.

The same product is prepared directly from 2-aminobenzimidazole as follows:

To a stirred mixture containing 13.3 grams (0.1 mole) of 2-aminobenzimidazole, 250 ml. of chloroform, 18.5 grams (0.22 mole) of sodium bicarbonate and 35 ml. of water is added 20.8 grams (0.22 mole) of methyl chloroformate dropwise, keeping the temperature around 25°. Stirring is continued for a short while until all solids have disappeared. The chloroform layer is separated, washed with 50 ml. of water, dried over anhydrous sodium sulfate, decolorized with Darco activated charcoal and vacuum concentrated to dryness. The solid residue is washed with hexane, filtered and dried. The yield is 91% of material which does not depress the melting point of the product prepared above.

A 0.2% by weight water suspension of this chemical is prepared and applied to tomato plant foliage. When the spray deposit has dried, the foliage is inoculated with spores of the early blight fungus (*Alternaria solani*). After a suitable incubation period the foliage is examined and it is found that there is only 4% disease on the treated foliage. In contrast there is a 100% disease on untreated foliage similarly inoculated.

EXAMPLE 2

*Preparation of benzimidazole-2-carbamic acid, methyl ester and 2-carboxyamino-1-benzimidazole carboxylic acid, dimethyl ester*

A mixture of 76 grams (1 mole) of thiourea and 37 ml. of water is stirred, and 73 grams of dimethyl sulfate is added over a period of ten minutes. The temperature rises to 105° C. The solution is kept refluxing for a period of one hour. The solution is cooled, and 100 ml. of alcohol are added. The crystalline solid is collected on a filter and dried. It consists of 2-methylpseudothiourea sulfate.

A solution of 70 grams (0.5 mole) of 2-methyl-thiopseudourea sulfate in 300 ml. of water is cooled in an ice bath. While stirring, 100 grams (1.06 mole) of methylchloroformate and a solution of 70 grams (1.75 mole) of sodium hydroxide in 200 ml. of water are added simultaneously. The mixture is extracted with chloroform. The extract is dried over anhydrous sodium sulfate, filtered, and vacuum concentrated. The solid residue is recrystallized from methanol and yields pure 2-methylthiopseudourea-1,3-dicarboxylic acid, dimethyl ester, melting at 100–102° C.

A mixture of 18.5 grams (0.09 mole) of the above pseudothiourea derivative, 9.7 grams (0.09 mole) of o-phenylenediamine and 150 ml. of water is refluxed for a period of one hour. The solid which separates is collected on a filter, washed with water and acetone, and dried. It consists of benzimidazole-2-carbamic acid, methyl ester. Melting point 338° C. (decomposition)— yield 16.5 grams (96%).

To a mixture consisting of 9.55 grams (0.05 mole) of the above ester, 4.4 grams (0.052 mole) of sodium bicarbonate and 20 ml. of acetone is added 4.9 grams (0.052 mole) of methylchloroformate over a period of ten minutes, while stirring at room temperature. Stirring is continued until a sample of the slurry is completely soluble in a mixture of chloroform and water, which takes from one and one-half to two hours. Then, while stirring, 100 ml. of water are added to the slurry, and after 15 minutes of stirring the mixture is filtered. The solid is washed with water and dried. It weighs 12.0 grams (96%) and melts at 149–151° C. with decomposition. This material consists of at least 98% of 2-carboxyamino-1-benzimidazole carboxylic acid, dimethyl ester. Traces of impurities may be removed by recrystallization from acetonitrile.

*Analysis.*—Calcd. for $C_{11}H_{11}N_3O_4$: C, 53.0; H, 4.45; N, 16.9. Found: C, 53.03; H, 4.23; N, 16.96.

A 0.2% by weight water suspension of this compound is prepared and applied to tomato plant foliage. When the spray deposit has dried the foliage is inoculated with spores of the early blight fungus (*Alternaria solani*). After a suitable incubation period the foliage is examined and it is found that there is only 4% disease on the treated foliage and 100% disease on the untreated foliage.

A water suspension containing 0.001% by weight of this chemical is applied to the surface of sand in which barley plants are growing. The plants are then exposed to the powdery mildew fungus (*Erisiphe graminis*). After a suitable period of incubation the plants are examined for disease development. It is found that no powdery mildew has appeared on the treated plants but untreated plants are 100% diseased. Thus the chemical is also effective as a systemic fungicide.

This same test is repeated with cucumber plants. It is found that complete control of cucumber powdery mildew (*Erysiphe cichoracearum*) is obtained. Treated plants have no disease while untreated plants have 100% disease.

A water suspension containing 0.1% of the above compound was sprayed on the primary leaves of cucumber plants. As the new growth developed, it was repeatedly inoculated with spores of the powdery mildew fungus (*Erysiphe cichoracearum*). Four weeks after the chemical application, the newly developed leaves were still being protected from the disease. At the same time, untreated plants were virtually dead from the effects of the disease.

EXAMPLE 3

*Preparation of 2-carboximino-1,3-benzimidazoline dicarboxylic acid, trimethyl ester*

Five grams (0.02 mole) of 2-imino-1,3-benzimidazoline dicarboxylic acid, dimethyl ester are dissolved in 50 ml. of chloroform, and 2.0 grams (0.02 mole) of triethylamine are added. While stirring at room temperature, 2.0 grams (5% excess over 0.02 mole) of methyl chloroformate are added over a period of 1 hour. Stirring is continued over a period of 1 hour. The reaction mixture is washed with water, dried and evaporated in a vacuum. The syrup obtained consists essentially of the desired compound.

This compound is formulated into a wettable powder with the following ingredients:

| | Percent |
|---|---|
| 2 - carboximino - 1,3 - benzimidazoline dicarboxylic acid, trimethyl ester | 50 |
| Alkyl naphthalene sulfonic acid, Na salt | 0.75 |
| Low viscosity methyl cellulose | 0.25 |
| Kaolin clay | 49 |

This wettable powder, when dispersed in water at a concentration of 2 lbs. per 100 gallons of water and sprayed on cucumber foliage at the rate of 100 gallons per acre, prevents powdery mildew (*Erysiphe cichoracearum*).

EXAMPLE 4

*Preparation of 2 - carboxyamino - 1 - benzimidazole carboxylic acid, dimethyl ester 1:1 hydroxy copper II complex monohydrate*

Equimolar quantities of 2-carboxyamino-1-benzimidazole carboxylic acid, dimethyl ester, cupric acetate monohydrate and two molar equivalents of sodium methylate are dissolved separately in methanol. The sodium methylate solution is added rapidly to the 2-carboxyamino-1-benzimidazole carboxylic acid, dimethyl ester solution, mixed thoroughly and then the cupric acetate solution is added at a moderate rate. An immediate deep green precipitate results. This is filtered, washed first with methanol and then with water. The compound is air dried. It analyzes for the composition

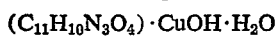

$(C_{11}H_{10}N_3O_4) \cdot CuOH \cdot H_2O$

Structure of this compound:

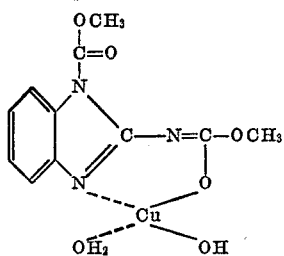

This compound is formulated into a wettable powder with the following ingredients:

| | Percent |
|---|---|
| 2-carboxyamino-1-benzimidazole carboxylic acid, dimethyl ester 1:1 hydroxy copper II complex monohydrate | 50 |
| Alkyl naphthalene sulfonic acid, Na salt | 0.75 |
| Sodium lignin sulfonate | 1 |
| Diatomaceous silica | 48.25 |

This wettable powder, when dispersed in water at a concentration of 2 pounds per 100 gallons of water and sprayed on pear trees at the rate of 200 gallons per acre, prevents pear scab (*Venturia pyrina*).

EXAMPLE 5

*Preparation of 2-carboxyamino-1-benzimidazole carboxylic acid, dimethyl ester 2:1 copper II complex*

To one molar equivalent of 2-carboxyamino-1-benzimidazole carboxylic acid, dimethyl ester dissolved in the smallest amount of dimethylformamide possible is added with stirring one-half molar equivalent of cupric acetate monohydrate also dissolved in the minimum amount of dimethylformamide. The resulting solution is a bright green. With continued stirring a light yellow-green crystalline precipitate forms. This is filtered and washed with dimethylformamide, then with methanol, and air dried. The compound analyzes for the composition $(C_{11}H_{10}N_3O_4)$ Cu. Structure of this compound:

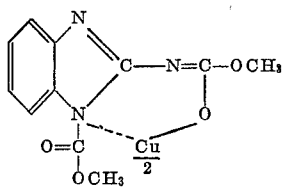

This compound is formulated into a wettable powder with the following ingredients:

| | Percent |
|---|---|
| 2-carboxyamino-1-benzimidazole carboxylic acid, dimethyl ester 2:1 copper II complex | 75 |
| Alkyl naphthalene sulfonic acid, Na salt | 1.75 |
| Sodium lignin sulfonate | 1 |
| Diatomaceous silica | 22.25 |

This wettable powder is dispersed in water at a concentration of 0.2% active ingredient. This composition when sprayed on rose foliage prevents powdery mildew (*Sphaerotheca humuli*).

EXAMPLE 6

*Preparation of 2-imino-1,3-benzimidazoline dicarboxylic acid, dimethyl ester 1:1 hydroxy copper II complex monohydrate*

Equimolar quantities of 2-imino-1,3-benzimidazoline dicarboxylic acid, dimethyl ester, cupric acetate monohydrate and two molar equivalents of sodium methylate are dissolved separately in methanol. The sodium methylate solution is added rapidly to the 2-imino-1,3-benzimidazoline dicarboxylic acid, dimethyl ester solution, mixed thoroughly and then the cupric acetate solution is added at a moderate rate. An immediate deep green precipitate results. It is filtered and washed first with methanol, then with water. The compound is air dried. It analyzes for the composition $(C_{11}H_{10}N_3O_4) \cdot CuOH \cdot H_2O$ Structure of this composition:

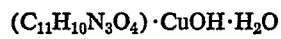
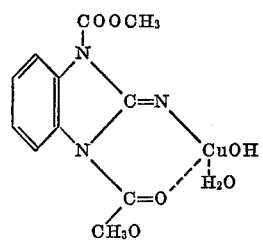

This compound is formulated with the following ingredients:

| | Percent |
|---|---|
| 2-imino-1,3-benzimidazoline dicarboxylic acid, dimethyl ester 1:1 hydroxy copper II complex monohydrate | 50 |
| Alkyl naphthalene sulfonic acid, Na salt | 0.75 |
| Sodium lignin sulfonate | 0.50 |
| Diatomaceous silica | 48.75 |

This composition mixed in water at 4 pounds per 100 gallons and sprayed on apples at 200 gallons per acre prevents apple scab (*Venturia inaequalis*).

EXAMPLE 7

*Preparation of 2-imino-1,3-benzimidazoline dicarboxylic acid, dimethyl ester 2:1 copper II complex*

To one molar equivalent of 2-imino-1,3-benzimidazoline dicarboxylic acid, dimethyl ester dissolved in the smallest amount of dimethylformamide possible is added with stirring one-half molar equivalent of cupric acetate monohydrate also dissolved in the minimum amount of dimethylformamide. The resulting solution is a bright green. With continued stirring a light yellow-green crystalline precipitate forms. This is filtered and washed first with dimethylformamide, then with methanol, and air dried. The compound analyzes for the composition $(C_{11}H_{10}N_3O_4)Cu$. Structure of this compound:

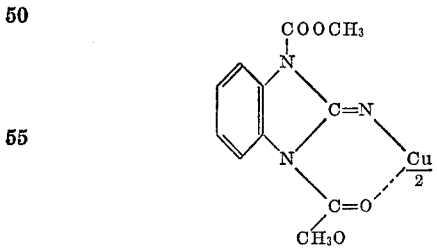

This compound is formulated as follows:

| | Percent |
|---|---|
| 2-imino-1,3-benzimidazoline dicarboxylic acid, dimethyl ester 2:1 copper II complex | 30 |
| Hydrated attapulgite | 1.5 |
| Sodium lignin sulfonate | 5 |
| Water | 64.5 |

The ingredients are milled together until the active component is substantially below 100 microns. The formulation is mixed with water to give a concentration of 0.2% active ingredient. When sprayed on apple trees at 200 gallons of mix per acre, this composition will control apple scab (*Venturia inaequalis*).

The following further illustrates the preparation of compounds of the invention:

EXAMPLE 8

*Preparation of 2-carboxyamino-1-benzimidazole carboxylic acid, dimethyl ester 2:1 copper derivative diammonia monomethanol solvate*

Anhydrous ammonia is bubbled through a solution of 0.01 mole of 2-carboxyamino-1-benzimidazole carboxylic acid, dimethyl ester on anhydrous methanol. A large excess (0.03 mole) of copper acetate monohydrate is suspended in methanol, and anhydrous ammonia is bubbled through until the cupric acetate has dissolved. The two solutions are poured together into a flask, and more ammonia is passed through the deep blue mixture. The flask is stoppered and allowed to stand overnight. The blue-black crystals which form are collected on a filter, and washed first with water and then with ether, then dried. The filtrate is diluted with a large volume of water and allowed to stand for 24 hours, yielding an additional quantity of product. The product analyzes for the composition $(C_{11}H_{10}N_3O_4)_2Cu \cdot 2NH_3 \cdot CH_3OH$.

EXAMPLE 9

*Preparation of 2-carboxyamino-1-benzimidazole carboxylic acid, dimethyl ester 2:1 nickel complex dihydrate*

To a solution of 0.1 mole of 2-carboxyamino-1-benzimidazole carboxylic acid, dimethyl ester in ethyl acetate is added a solution of 0.05 mole of nickel acetate tetrahydrate in 90% ethanol. After digestion and evaporation to a small volume, a precipitate forms, which is filtered, washed with water and dried. The product analyzes for the composition $(C_{11}H_{10}N_3O_4)_2 \cdot Ni \cdot 2H_2O$.

EXAMPLE 10

*Preparation of 2-carboxyamino-1-benzimidazole carboxylic acid, dimethyl ester 2:1 magnesium derivative, monohydrate*

To a solution of 0.1 mole of sodium methoxide in 100 ml. anhydrous methanol is added a solution of 0.1 mole of 2-carboxyamino-1-benzimidazole carboxylic acid, dimethyl ester in anhydrous methanol. The solution thus obtained is added in small amounts to an ethanolic solution containing 0.05 mole of magnesium acetate tetrahydrate. The resultant precipitate is filtered, washed with methanol and water, and dried. The product analyzes for the composition $(C_{11}H_{10}N_3O_4)_2Mg \cdot H_2O$.

EXAMPLE 11

*Preparation of 2-carboxyamino-1-benzimidazole carboxylic acid, dimethyl ester 1:1 hydroxy cobalt derivative dihydrate*

To a solution of 0.2 mole of 2-carboxyamino-1-benzimidazole carboxylic acid, dimethyl ester in anhydrous methanol is added a solution of 0.04 mole of sodium methoxide in anhydrous methanol. Then, a solution of 0.02 mole of cobaltous acetate tetrahydrate in methanol is added. The mixture, containing the precipitated cobalt complex, is heated and stirred for 15 minutes and then filtered. The precipitate is washed first with methanol, then with water and dried. The product analyzes for the composition $(C_{11}H_{10}N_3O_4)Co \cdot OH \cdot 2H_2O$.

EXAMPLE 12

*Preparation of 2-carboxyamino-1-benzimidazole carboxylic acid, dimethyl ester 1:1 hydroxy cobalt derivative dianiline solvate*

The product of Example 11 is first mulled with aniline and then heated to 115° C. After cooling, the precipitate is filtered, washed with aniline and dried in an air stream. The product is analyzed as the composition $(C_{11}H_{10}N_3O_4) \cdot Co \cdot OH \cdot 2C_6H_7N$

EXAMPLE 13

*Preparation of 2-carboxyamino-1-benzimidazole carboxylic acid, dimethyl ester 1:1 hydroxy cobalt derivative*

The product of Example 11 is heated in a vacuum oven at 130° for 18 hours. The compound loses the theoretical quantity of water and changes in color.

EXAMPLE 14

*Preparation of 1-ethoxycarbonyl-2-benzimidazole carbamic acid, methyl ester*

To a slurry consisting of 7.65 grams (0.04 mole) of 2-benzimidazole carbamic acid, methyl ester, prepared as in Example 2, 3.7 grams (0.044 mole) of sodium bicarbonate and 80 ml. of chloroform is added 4.8 grams (0.044 mole) of ethyl chloroformate over a period of ten minutes, while stirring at room temperature. Stirring is continued until all organic solid has dissolved. This requires a period of six hours. The mixture is filtered to remove the inorganic solid, and the filtrate is vacuum concentrated to a solid which consists of 1-ethoxycarbonyl-2-benzimidazole carbamic acid, methyl ester. Weight 10.5 grams (100%), melting point 130–134° dec. Recrystallization from carbon tetrachloride raises the melting point to 137–140° dec.

*Analysis.*—Calcd. for $C_{12}H_{13}N_3O_4$: C, 54.75; H, 4.98. Found: C, 54.51; H, 5.01.

This compound is formulated as follows:

|  | Percent |
| --- | --- |
| 1-ethoxycarbonyl-2-benzimidazole carbamic acid, methyl ester | 75.0 |
| Alkylnaphthalenesulfonic acid, Na salt | 1.0 |
| Sodium lignin sulfonate | 1.0 |
| Diatomaceous silica | 23.0 |

This wettable powder is dispersed in water at a concentration of 0.04% active ingredient and applied to the foliage of young pear trees. When the spray deposit has dried, the foliage is inoculated with the pear scab fungus (*Venturia pyrina*). After a suitable incubation period, the foliage is examined and it is found that it contains essentially no disease. Pear trees not treated with this compound but otherwise handled the same as the treated trees are completely diseased.

EXAMPLE 15

*Preparation of 1-methoxycarbonyl-2-benzimidazole carbamic acid, ethyl ester*

A slurry consisting of 4.1 grams (0.02 mole) of 2-benzimidazole carbamic acid, ethyl ester [prepared by the method of Murray and Dains, J. Am. Chem. Soc. 56, 145 (1934)], 1.85 grams (0.022 mole) of sodium bicarbonate and 40 ml. of chloroform is stirred at room temperature, and 2.1 grams (0.022 mole) of methylchloroformate is added over a period of ten minutes. Stirring is continued until the organic starting material has gone into solution, which requires a period of three hours. The mixture is filtered to remove the inorganic material, and the filtrate is vacuum concentrated to a solid, which consists of 1-methoxycarbonyl-2-benzimidazole carbamic acid, ethyl ester. It weighs 5.3 grams (100%) and melts at 129–130.5° C. Recrystallization from carbon tetrachloride does not alter the melting point.

*Analysis.*—Calcd. for $C_{12}H_{13}N_3O_4$: C, 54.75; H, 4.98. Found: C, 55.28; H, 4.97.

This compound is formulated as in Example 14. It is dispersed in water at a concentration of 0.04% active ingredient and applied to the foliage of young apple trees. When the spray deposit has dried, the foliage is inoculated with the spores of the apple scab fungus (*Venturia inaequalis*). After a suitable incubation period, the foliage is examined and it is found that it contains essentially no disease. Apple trees not treated with this compound but otherwise handled the same as the treated trees are completely diseased.

EXAMPLE 16

*Preparation of 1-ethoxycarbonyl-2-benzimidazole carbamic acid, ethyl ester*

To a mixture of 8.2 grams (0.04 mole) of 2-benzimidazole carbamic acid, ethyl ester, prepared as described above, 3.5 grams (0.042 mole) of sodium bicarbonate and 16 ml. of acetone is added 4.6 grams (0.042 mole) of ethyl chloroformate over a period of ten minutes, while stirring at room temperature. Stirring is continued until a sample of the slurry is completely soluble in a mixture of chloroform and water. This requires a period of two hours. The mixture is filtered, and the solid is washed with water and dried. Weight 11.1 grams (100%), melting point 105–106° C. Recrystallization from cyclohexane does not alter the melting point. The compound is 1-ethoxycarbonyl-2-benzimidazole carbamic acid, ethyl ester.

*Analysis.*—Calcd. for $C_{13}H_{15}N_3O_4$: C, 56.31; H, 5.45. Found: C, 56.33; H, 5.43.

This compound is formulated as in Example 15. It is dispersed in water at a concentration of 0.2% active ingredient and applied to tomato plant foliage. When the spray deposit has dried the foliage is inoculated with the spores of the early blight fungus (*Alternaria solani*). After a suitable incubation period the foliage is examined and it is found that there is essentially no disease. Tomato plants not treated with this compound but otherwise handled the same as the treated plants are completely diseased.

EXAMPLE 17

*Preparation of 1-ethoxycarbonyl-3-n-pentoxy carbonyl-2-benzimidazole carbamic acid, methyl ester*

1-ethoxycarbonyl-2-benzimidazole carbamic acid, methyl ester, prepared as in Example 14, is reacted with equimolar amounts of n-pentyl chloroformate and triethyl amine in the manner described in Example 3. The syrup obtained consists essentially of the desired compound.

The compounds of Examples 8–15 and 17 have fungicidal activity similar to that of the compounds of the preceding examples.

The following compounds of the present invention are prepared exactly in accordance with the preceding examples as indicated in the following table, by replacing the reactants of the past examples with the indicated amount of the reactants of these present examples. The table shows not only the reactants in their relative proportions but also the product obtained.

| Ex. No. | Starting Materials (moles) | | Preparation, Method of Ex. No. | Product |
|---|---|---|---|---|
| 18 | 2-benzimidazole carbamic acid, methyl ester (0.1). | allyl chloroformate (0.1) | 2 | 1-allyloxycarbonyl-2-benzimidazole carbamic acid, methyl ester. |
| 19 | ....do.... | beta-chloroethyl chloroformate (0.1) | 2 | 1-(beta-chloroethyloxycarbonyl)-2-benzimidazole carbamic acid, methyl ester. |
| 20 | 5-chloro-2-benzimidazole carbamic acid, methyl ester (0.1). | tert. amyl chloroformate (0.1) | 2 | mixture of 5- and 6-chloro-1-tert.amyloxycarbonyl-2-benzimidazole carbamic acid, methyl esters. |
| 21 | 2-benzimidazole carbamic acid, ethyl ester (0.1). | isopropyl chloroformate (0.1) | 2 | 1-isopropyloxycarbonyl-2-benzimidazole carbamic acid, ethyl ester. |
| 22 | 2-benzimidazole carbamic acid, beta-chloroethyl ester (0.1). | methallyl chloroformate (0.1) | 2 | 1-methallyloxycarbonyl-2-benzimidazole carbamic acid, ethyl ester. |
| 23 | 5,6-dimethyl-2-benzimidazole carbamic acid, sec. butyl ester (0.1). | isobutyl chloroformate (0.1) | 2 | 5,6-dimethyl-1-isobutoxycarbonyl-2-benzimidazole carbamic acid, sec.butyl ester. |
| 24 | 2-carboxyamino-1-benzimidazole carboxylic acid, dimethyl ester (0.1). | $MnCl_2$ (0.05) | 5 | 2-carboxyamino-1-benzimidazole carboxylic acid, dimethyl ester manganese complex. |
| 25 | ....do.... | Zn acetate (0.05) | 10 | 2-carboxyamino-1-benzimidazole carboxylic acid, dimethyl ester zinc complex. |
| 26 | ....do.... | $CaCl_2$ (0.05) | 5 | 2-carboxyamino-1-benzimidazole carboxylic acid, dimethyl ester calcium complex. |
| 27 | ....do.... | $FeCl_2$ (0.05) | 5 | 2-carboxyamino-1-benzimidazole carboxylic acid, dimethyl ester ferrous complex. |
| 28 | ....do.... | $CoCl_2$ (0.05) | 5 | 2-carboxyamino-1-benzimidazole carboxylic acid, dimethyl ester cobalt complex. |
| 29 | 5-chloro-2-aminobenzimidazole (0.1) | $NaHCO_3$ (0.2); methyl chloroformate (0.2) | 1 | 5-chloro-2-imino-1,3-benzimidazoline dicarboxylic acid, dimethyl ester. |
| 30 | 5-chlorobenzimidazole-2-carbamic acid, methyl ester (0.1). | $NaHCO_3$ (0.1); methyl chloroformate (0.1) | 2 | mixture of 5- and 6-chloro-2-carboxyamino-1-benzimidazole carboxylic acid, dimethyl ester. |
| 31 | 5-chloro-2-imino-1,3-benzimidazoline dicarboxylic acid, dimethyl ester (0.1). | methyl chloroformate (0.1); $(C_2H_5)_3N$ (0.1) | 3 | 5-chloro-2-carboximino-1,3-benzimidazoline dicarboxylic acid, trimethyl ester. |
| 32 | 5-chloro-2-carboxyamino-1-benzimidazole carboxylic acid, dimethyl ester (0.1). | $Cu(Ac)_2 \cdot H_2O$ (0.1); $NaOCH_3$ (0.2) | 4 | 5-chloro-2-carboxyamino-1-benzimidazole carboxylic acid, dimethyl ester, 1:1 hydroxy copper complex monohydrate. |
| 33 | 5-chloro-2-imino-1,3-benzimidazoline dicarboxylic acid, dimethyl ester (0.1). | $(Cu(Ac)_2 \cdot H_2O$ (0.1); $NaOCH_3$ (0.2) | 6 | 5-chloro-2-imino-1,3-benzimidazoline dicarboxylic acid, dimethyl ester, 1:1 hydroxy copper complex monohydrate. |
| 34 | 5-chloro-2-carboxyamino-1-benzimidazole carboxylic acid, dimethyl ester (0.1). | $MnCl_2$ (0.05) | 5 | 5-chloro-2-carboxyamino-1-benzimidazole carboxylic acid, dimethyl ester, manganese complex. |
| 35 | ....do.... | $Zn(Ac)_2$ (0.05) | 5 | 5-chloro-2-carboxyamino-1-benzimidazole carboxylic acid, dimethyl ester, zinc complex. |
| 36 | ....do.... | $Cu(Ac)_2 \cdot H_2O$ (0.05) | 5 | 5-chloro-2-carboxyamino-1-benzimidazole carboxylic acid, dimethyl ester, 2:1 copper II complex. |
| 37 | 5-chloro-2-imino-1,3-benzimidazoline dicarboxylic acid, dimethyl ester (0.1). | $Cu(Ac)_2 \cdot H_2O$ (0.05) | 7 | 5-chloro-2-imino-1,3-benzimidazoline dicarboxylic acid, dimethyl ester, 2:1 copper II complex. |
| 38 | 5-nitro-2-aminobenzimidazole (0.1) | $NaHCO_3$ (0.2); methyl chloroformate (0.2) | 1 | 5-nitro-2-imino-1,3-benzimidazoline dicarboxylic acid, dimethyl ester. |
| 39 | 5-nitrobenzimidazole-2-carbamic acid, methyl ester (0.1). | $NAHCO_3$ (0.1); methyl chloroformate (0.1) | 2 | mixture of 5- and 6-nitro-2-carboxyamino-1-benzimidazole carboxylic acid, dimethyl ester. |
| 40 | 5-nitro-2-imino-1,3-benzimidazoline dicarboxylic acid, dimethyl ester (0.1). | methyl chloroformate (0.1); $(C_2H_5)_3N$ (0.1) | 3 | 5-nitro-2-carboximino-1,3-benzimidazoline dicarboxylic acid, trimethyl ester. |
| 41 | 5-nitro-2-carboxyamino-1-benzimidazole carboxylic acid, dimethyl ester (0.1). | $(Cu(Ac)_2 \cdot H_2O$ (0.1); $NaOCH_3$ (0.2) | 4 | 5-nitro-2-carboxyamino-1-benzimidazole carboxylic acid, dimethyl ester, 1:1 hydroxy copper complex monohydrate. |
| 42 | 5-nitro-2-imino-1,3-benzimidazoline dicarboxylic acid, dimethyl ester (0.1). | $Cu(Ac)_2 \cdot H_2O$ (0.1); $NaOCH_3$ (0.2) | 6 | 5-nitro-2-imino-1,3-benzimidazoline dicarboxylic acid, dimethyl ester, 1:1 hydroxy copper complex monohydrate. |

| Ex. No. | Starting Materials (moles) | | Preparation, Method of Ex. No. | Product |
|---|---|---|---|---|
| 43 | 5-nitro-2-carboxyamino-1-benzimidazole carboxylic acid, dimethyl ester (0.1). | MnCl₂ (0.05) | 5 | 5-nitro-2-carboxyamino-1-benzimidazole carboxylic acid, dimethyl ester, manganese complex. |
| 44 | ....do.... | Zn(Ac)₂ (0.05) | 5 | 5-nitro-2-carboxyamino-1-benzimidazole carboxylic acid, dimethyl ester, zinc complex. |
| 45 | ....do.... | Cu(Ac)₂·H₂O (0.05) | 5 | 5-nitro-2-carboxyamino-1-benzimidazole carboxylic acid, dimethyl ester, 2:1 copper II complex. |
| 46 | 5-nitro-2-imino-1,3-benzimidazoline dicarboxylic acid dimethyl ester (0.1). | Cu(Ac)₂·H₂O (0.05) | 7 | 5-nitro-2-imino-1,3-benzimidazoline dicarboxylic acid, dimethyl ester, 2:1 copper II complex. |
| 47 | 5-methoxy-2-aminobenzimidazole (0.1). | {NaHCO₃ (0.2), methyl chloroformate (0.2)} | 1 | 5-methoxy-2-imino-1,3-benzimidazoline dicarboxylic acid, dimethyl ester. |
| 48 | 5-methoxy-benzimidazole-2-carbamic acid, methyl ester (0.1). | {NaHCO₃ (0.1), methyl chloroformate (0.1)} | 2 | mixture of 5- and 6-methoxy-2-carboxyamino-1-benzimidazole carboxylic acid, dimethyl ester. |
| 49 | 5-methoxy-2-imino-1,3-benzimidazoline dicarboxylic acid, dimethyl ester (0.1). | {methyl chloroformate (0.1), (C₂H₅)₃N (0.1)} | 3 | 5-methoxy-2carboximino-1,3-benzimidazoline dicarboxylic acid, trimethyl ester. |
| 50 | 5-methoxy-2-carboxyamino-1-benzimidazole carboxylic acid, dimethyl ester (0.1). | {Cu(Ac)₂·H₂O (0.1), NaOCH₃ (0.2)} | 4 | 5-methoxy-2-carboxyamino-1-benzimidazole carboxylic acid, dimethyl ester, 1:1 hydroxy copper complex monohydrate. |
| 51 | 5-methoxy-2-imino-1,3-benzimidazoline dicarboxylic acid, dimethyl ester (0.1). | {Cu(Ac)₂·H₂O (0.1), NaOCH₃ (0.2)} | 6 | 5-methoxy-2-imino-1,3-benzimidazoline dicarboxylic acid, dimethyl ester, 1:1 hydroxy copper complex monohydrate. |
| 52 | 5-methoxy-2-carboxyamino-1-benzimidazole carboxylic acid, dimethyl ester (0.1). | MnCl₂ (0.05) | 5 | 5-methoxy-2-carboxyamino-1-benzimidazole carboxylic acid, dimethyl ester, manganese complex. |
| 53 | ....do.... | Zn(Ac)₂ (0.05) | 5 | 5-methoxy-2-carboxyamino-1-benzimidazole carboxylic acid, dimethyl ester, zinc complex. |
| 54 | ....do.... | Cu(Ac)₂·H₂O (0.05) | 5 | 5-methoxy-2-carboxyamino-1-benzimidazole carboxylic acid, dimethyl ester, 2:1 copper II complex. |
| 55 | 5-methoxy-2-imino-1,3-benzimidazoline dicarboxylic acid, dimethyl ester (0.1). | Cu(Ac)₂·H₂O (0.05) | 7 | 5-methoxy-2-imino-1,3-benzimidazoline dicarboxylic acid, dimethyl ester, 2:1 copper II complex. |
| 56 | 4-methyl-2-aminobenzimidazole (0.1). | {NaHCO₃ (0.2), methyl chloroformate (0.2)} | 1 | 4-methyl-2-imino-1,3-benzimidazoline dicarboxylic acid, dimethyl ester. |
| 57 | 4-methyl-benzimidazole-2-carbamic acid, methyl ester (0.1). | {NaHCO₃ (0.1), methyl chloroformate (0.1)} | 2 | 4-methyl-2-carboxyamino-1-benzimidazole carboxylic acid, dimethyl ester. |
| 58 | 4-methyl-2-imino-1,3-benzimidazoline dicarboxylic acid, dimethyl ester (0.1). | {methyl chloroformate (0.1), (C₂H₅)₃N (0.1)} | 3 | 4-methyl-2-carboximino-1,3-benzimidazoline dicarboxylic acid, trimethyl ester. |
| 59 | 4-methyl-2-carboxyamino-1-benzimidazole carboxylic acid, dimethyl ester (0.1). | {Cu(Ac)₂·H₂O (0.1), NaOCH₃ (0.2)} | 4 | 4-methyl-2-carboxyamino-1-benzimidazole carboxylic acid, dimethyl ester, 1:1 hydroxy copper complex monohydrate. |
| 60 | 4-methyl-2-imino-1,3-benzimidazoline dicarboxylic acid, dimethyl ester (0.1). | {Cu(Ac)₂·H₂O (0.1), NaOCH₃ (0.2)} | 6 | 4-methyl-2-imino-1,3-benzimidazoline dicarboxylic acid, dimethyl ester, 1:1 hydroxy copper complex monohydrate. |
| 61 | 4-methyl-2-carboxyamino-1-benzimidazole carboxylic acid, dimethyl ester (0.1). | MnCl₂ (0.05) | 5 | 4-methyl-2-carboxyamino-1-benzimidazole carboxylic acid, dimethyl ester, manganese complex. |
| 62 | ....do.... | Zn(Ac)₂ (0.05) | 5 | 4-methyl-2-carboxyamino-1-benzimidazole carboxylic acid, dimethyl ester, zinc complex. |
| 63 | ....do.... | Cu(Ac)₂·H₂O (0.05) | 5 | 4-methyl-2-carboxyamino-1-benzimidazole carboxylic acid, dimethyl ester, 2:1 copper II complex. |
| 64 | 4-methyl-2-imino-1,3-benzimidazoline dicarboxylic acid, dimethyl ester (0.1). | Cu(Ac)₂·H₂O (0.05) | | 4-methyl-2-imino-1,3-benzimidazoline dicarboxylic acid, dimethyl ester, 2:1 copper II complex. |
| 65 | 5,6-dimethylbenzimidazole-2-carbamic acid, methyl ester (0.1). | {NaHCO₃ (0.1), methyl chloroformate (0.1)} | 2 | 5,6-dimethyl-1-methoxycarbonyl-2-benzimidazole carbamic acid, methyl ester. |
| 66 | 5-methyl-6-chlorobenzimidazole-2-carbamic acid, tert. butyl ester (0.1). | {allyl chloroformate (0.1), NaHCO₃ (0.1)} | 2 | mixture of 5-methyl-6-chloro-1-allyloxycarbamyl-2-benzimidazole carbamic acid, tert. butyl ester and 5-chloro-6-methyl-1-allyloxy-carbamyl-2-benzimidazole-carbamic acid, tert. butyl ester. |
| 67 | 4-methoxy-6-bromobenzimidazole-2-carbamic acid, ethyl ester (0.1). | {isopropylchloroformate (0.1), NaHCO₃ (0.1)} | 2 | mixture of 4-methoxy-6-bromo-1-isopropoxycarbonyl-2-benzimidazole carbamic acid, ethyl ester and 5-bromo-7-methoxy-1-isopropoxy carbonyl-2-benzimidazole carbamic acid, ethyl ester. |
| 68 | 5,6-dichloro-2-amino-1-benzimidazole carboxylic acid, methyl ester (0.1). | {NaHCO₃ (0.1), n-propyl chloroformate (0.1)} | 1 | 5,6-dichloro-2-imino-1-methoxycarbonyl-3-n-propoxycarbonyl benzimidazoline. |
| 69 | 5,6-dichloro-benzimidazole-2-carbamic acid, allyl ester (0.1). | {tert.butyl chloroformate (0.1), NaHCO₃ (0.1)} | 2 | 5,6-dichloro-1-tert.butylcarbonyl-2-benzimidazole carbamic acid, allyl ester. |
| 70 | 5,6-dichloro-2-amino-1-methoxycarbonyl-3-n-propoxy carbonyl benzimidazoline (0.1). | {3-bromopropylchloroformate (0.1), (C₂H₅)₃N (0.1)} | 3 | 5,6-dichloro-1-methoxycarbonyl-3-n-propoxy-2-benzimidazoline carbamic acid, 3-bromopropyl ester. |
| 71 | 5,6-dichloro-1-tert. butoxycarbonyl-2-benzimidazole carbamic acid, allyl ester (0.1). | MnCl₂ (0.05) | 5 | 5,6-dichloro-1-tert.butoxycarbonyl-2-benzimidazole carbamic acid, allyl ester, manganese complex. |
| 72 | ....do.... | Zn(Ac)₂ (0.05) | 5 | 5,6-dichloro-tert.butoxycarbonyl-2-benzimidazole carbamic acid, allyl ester, zinc complex. |
| 73 | ....do.... | Cu(Ac)₂·H₂O (0.05) | 5 | 5,6-dichloro-1-tert.butoxy carbonyl-2-benzimidazole carbamic acid, allyl ester, 2:1 copper II complex. |
| 74 | 5,6-dichloro-2-imino-1-methoxycarbonyl-3-n-propoxycarbonyl benzimidazoline (0.1). | Cu(Ac)₂·H₂O (0.05) | 7 | 5,6-dichloro-2-imino-methoxycarbonyl-3-n-propoxy carbonylbenzimidazoline 2:1 copper II complex. |
| 75 | 4,5-dichloro-6-nitro benzimidazole-2-carbamic acid, isopropyl ester (0.1). | {NaHCO₃ (0.1), allyl chloroformate (0.1)} | 2 | mixture of 4,5-dichloro-6-nitro-1-allyloxy-carbamyl benzimidazole-2-carbamic acid, isopropyl ester, and 6,7-dichloro-5-nitro-1-allyloxy carbonylbenzimidazole-2-carbamic acid, isopropyl ester. |
| 76 | 4,5,6-tribromo-2-aminobenzimidazole (0.1). | {NaHCO₃ (0.2), methyl chloroformate (0.2)} | 1 | 4,5,6-tribromo-2-imino-1,3-benzimidazoline dicarboxylic acid, dimethyl ester. |
| 77 | 4,5,6-tribromo-benzimidazole-2-carbamic acid, methyl ester (0.1). | {NaHCO₃ (0.1), methyl chloroformate (0.1)} | 2 | 4,5,6-tribromo-2-carboxyamino-1-benzimidazole carboxylic acid, dimethyl ester. |
| 78 | 4,5,6-tribromo-2-imino-1,3-benzimidazoline dicarboxylic acid, dimethyl ester (0.1). | {methyl chloroformate (0.1), (C₂H₅)₃N (0.1)} | 3 | 4,5,6-tribromo-2-carboxyimino-1,3-benzimidazoline dicarboxylic acid, trimethyl ester. |

| Ex. No. | Starting Materials (moles) | | Preparation, Method of Ex. No. | Product |
|---|---|---|---|---|
| 79 | 4,5,6-tribromo-2-carboxyamino-1-benzimidazole carboxylic acid, dimethyl ester (0.1). | Cu(Ac)₂·H₂O (0.1)<br>NaOCH₃ (0.2) | 4 | 4,5,6-tribromo-2-carboxyamino-1-benzimidazole carboxylic acid, dimethyl ester, 1:1 hydroxy copper complex monohydrate. |
| 80 | 4,5,6-tribromo-2-imino-1,3-benzimidazoline dicarboxylic acid, dimethyl ester (0.1). | Cu(Ac)₂·H₂O (0.1)<br>NaOCH₃ (0.2) | 6 | 4,5,6-tribromo-2-imino-1,3-benzimidazoline dicarboxylic acid, dimethyl ester, 1:1 hydroxy copper complex monohydrate. |
| 81 | 4,5,6-tribromo-2-carboxyamino-1-benzimidazole carboxylic acid, dimethyl ester (0.1). | MnCl₂ (0.05) | 5 | 4,5,6-tribromo-2-carboxyamino-1-benzimidazole carboxylic acid, dimethyl ester, manganese complex. |
| 82 | ____do____ | Zn(Ac)₂ (0.05) | 5 | 4,5,6-tribromo-2-carboxyamino-1-benzimidazole carboxylic acid, dimethyl ester, zinc complex. |
| 83 | ____do____ | Cu(Ac)₂·H₂O (0.05) | 5 | 4,5,6-tribromo-2-carboxyamino-1-benzimidazole carboxylic acid, dimethyl ester, 2:1 copper II complex. |
| 84 | 4,5,6-tribromo-2-imino-1,3-benzimidazoline dicarboxylic acid, dimethyl ester (0.1). | Cu(Ac)₂·H₂O (0.05) | 7 | 4,5,6-tribromo-2-imino-1,3-benzimidazoline dicarboxylic acid, dimethyl ester, 2:1 copper II complex. |
| 85 | 2-amino-benzimidazole (0.1). | NaHCO₃ (0.2)<br>beta-chloroethyl chloroformate (0.2) | 1 | 2-imino-1,3-benzimidazolinedicarboxylic acid, beta-chloroethyl diester. |
| 86 | benzimidazole-2-carbamic acid, beta-chloroethyl ester (0.1). | beta-chloroethyl chloroformate (0.1)<br>NaHCO₃ (0.1) | 2 | 2-carboxyamino-1-benzimidazole carboxylic acid, beta-chloroethyl diester. |
| 87 | 2-imino-1,3-benzimidazoline dicarboxylic acid, beta-chloroethyl diester (0.1). | beta-chloroethyl chloroformate (0.1)<br>(C₂H₅)₃N (0.1) | 3 | 2-carboximino-1,3-benzimidazole dicarboxylic acid, beta-chloroethyl triester. |
| 88 | 2-carboxyamino-1-benzimidazole carboxylic acid, beta-chloroethyl diester (0.1). | Cu(Ac)₂·H₂O (0.1)<br>NaOCH₃ (0.2) | 4 | 2-carboxyamino-1-benzimidazole carboxylic acid, beta-chloroethyl diester, 1:1 hydroxy copper complex monohydrate. |
| 89 | 2-imino-1,3-benzimidazoline dicarboxylic acid, beta-chloroethyl diester (0.1). | Cu(Ac)₂·H₂O (0.1)<br>NaOCH₃ (0.2) | | 2-imino-1,3-benzimidazolinedicarboxylic acid, beta-chloroethyl diester, 1:1 hydroxy copper complex monohydrate. |
| 90 | 2-carboxyamino-1-benzimidazole carboxylic acid, beta-chloroethyl diester (0.1). | MnCl₂ (0.05) | 5 | 2-carboxyamino-1-benzimidazole carboxylic acid, beta-chloroethyl diester, manganese complex. |
| 91 | ____do____ | Zn(Ac)₂ (0.05) | 5 | 2-carboxyamino-1-benzimidazole carboxylic acid, beta-chloroethyl diester, zinc complex. |
| 92 | ____do____ | Cu(Ac)₂·H₂O (0.05) | 5 | 2-carboxyamino-1-benzimidazole carboxylic acid, beta-chloroethyl diester, 2:1 copper II complex. |
| 93 | 2-imino-1,3-benzimidazoline dicarboxylic acid, beta-chloroethyl diester (0.1). | Cu(Ac)₂·H₂O (0.05) | 7 | 2-imino-1,3-benzimidazolinedicarboxylic acid, beta-chloroethyl diester, 2:1 copper II complex. |
| 94 | 2-amino-benzimidazole (0.1). | NaHCO₃ (0.2)<br>allyl chloroformate (0.2) | 1 | 2-imino-1,3-benzimidazolinedicarboxylic acid, diallyl ester. |
| 95 | benzimidazole-2-carbamic acid, allyl ester (0.1). | allyl chloroformate (0.1)<br>NaHCO₃ (0.1) | 2 | 2-carboxyamino-1-benzimidazole carboxylic acid, diallyl ester. |
| 96 | 2-imino-1,3-benzimidazoline dicarboxylic acid, diallyl ester (0.1). | allyl chloroformate (0.1)<br>(C₂H₅)₃N (0.1) | 3 | 2-carboximino-1,3-benzimidazole dicarboxylic acid, triallyl ester. |
| 97 | 2-carboxyamino-1-benzimidazole carboxylic acid, diallyl ester (0.1). | Cu(Ac)₂·H₂O (0.1)<br>NaOCH₃ (0.2) | 4 | 2-carboxyamino-1-benzimidazole carboxylic acid, diallyl ester, 1:1 hydroxy copper complex monohydrate. |
| 98 | 2-imino-1,3-benzimidazoline dicarboxylic acid, diallyl ester (0.1). | Cu(Ac)₂·H₂O (0.1)<br>NaOCH₃ (0.2) | 6 | 2-imino-1,3-benzimidazolinedicarboxylic acid, diallyl ester, 1:1 hydroxy copper complex monohydrate. |
| 99 | 2-carboxyamino-1-benzimidazole carboxylic acid, diallyl ester (0.1). | MnCl₂ (0.05) | 5 | 2-carboxyamino-1-benzimidazole carboxylic acid, diallyl ester, manganese complex. |
| 100 | ____do____ | Zn(Ac)₂ (0.05) | 5 | 2-carboxyamino-1-benzimidazole carboxylic acid, diallyl ester, zinc complex. |
| 101 | ____do____ | Cu(Ac)₂·H₂O (0.05) | 5 | 2-carboxyamino-1-benzimidazole carboxylic acid, diallyl ester, 2:1 copper II complex. |
| 102 | 2-imino-1,3-benzimidazoline dicarboxylic acid, diallyl ester (0.1). | Cu(Ac)₂·H₂O (0.05) | 7 | 2-imino-1,3-benzimidazolinedicarboxylic acid, diallyl ester, 2:1 copper II complex. |
| 103 | 2-amino-benzimidazole (0.1). | NaHCO₃ (0.2)<br>tert.amyl chloroformate (0.2) | 1 | 2-imino-1,3-benzimidazolinedicarboxylic acid, ditertiary amyl ester. |
| 104 | benzimidazole-2-carbamic acid, tertiary amyl ester (0.1). | tert.amyl chloroformate (0.1)<br>NaHCO₃ (0.1) | 2 | 2-carboxyamino-1-benzimidazole carboxylic acid, ditertiary amyl ester. |
| 105 | 2-imino-1,3-benzimidazoline dicarboxylic acid, tertiary amyl diester (0.1). | tert.amyl chloroformate (0.1)<br>(C₂H₅)₃N (0.1) | 3 | 2-carboximino-1,3-benzimidazole dicarboxylic acid, tertiary amyl triester. |
| 106 | 2-carboxyamino-1-benzimidazole carboxylic acid, tertiary amyl diester (0.1). | Cu(Ac)₂·H₂O (0.1)<br>NaOCH₃ (0.2) | 4 | 2-carboxyamino-1-benzimidazole carboxylic acid, ditertiary amyl ester, 1:1 hydroxy copper complex monohydrate. |
| 107 | 2-imino-1,3-benzimidazoline dicarboxylic acid, tertiary amyl diester (0.1). | Cu(Ac)₂·H₂O (0.1)<br>NaOCH₃ (0.2) | 6 | 2-imino-1,3-benzimidazolinedicarboxylic acid, ditertiary amyl ester, 1:1 hydroxy copper complex monohydrate. |
| 108 | 2-carboxyamino-1-benzimidazole carboxylic acid, tertiary amyl diester (0.1). | MnCl₂ (0.05) | 5 | 2-carboxyamino-1-benzimidazole carboxylic acid, ditertiary amyl ester, manganese complex. |
| 109 | ____do____ | Zn(Ac)₂ (0.05) | 5 | 2-carboxyamino-1-benzimidazole carboxylic acid, ditertiary amyl ester, zinc complex. |
| 110 | ____do____ | Cu(Ac)₂·H₂O (0.05) | 5 | 2-carboxyamino-1-benzimidazole carboxylic acid, ditertiary amyl ester, 2:1 copper II complex. |
| 111 | 2-imino-1,3-benzimidazoline dicarboxylic acid, tertiary amyl diester (0.1). | Cu(Ac)₂·H₂O (0.05) | 7 | 2-imino-1,3-benzimidazolinedicarboxylic acid, ditertiary amyl ester, 2:1 copper II complex. |

The following examples further demonstrate the formulation of fungicidal compositions of the present invention and their use in the control of fungi:

EXAMPLE 112

| | Percent |
|---|---|
| 2-carboxyamino-1-benzimidazole carboxylic acid, di-beta-chloroethyl ester | 25 |
| Kaolin clay | 25 |
| Pyrophyllite | 50 |

The 2-carboxyamino-1-benzimidazole carboxylic acid, di-beta-chloroethyl ester is first blended with the minor diluent and micropulverized, then mixed with the major diluent and reblended until substantially homogeneous.

This fungicidal composition, when applied to apple foliage at the rate of 10 pounds active ingredient per acre, prevents powdery mildew (*Podosphaera leucotricha*).

EXAMPLE 113

| | Percent |
|---|---|
| 2-carboxyamino-1-benzimidazole carboxylic acid, diallyl ester | 20 |
| Tobacco dust | 80 |

This compound is formulated into a fungicidal dust by blending the listed ingredients together and passing them through a micropulverizer.

This fungicidal composition, when dusted on the foliage of pear trees at the rate of 10 pounds per acre of active ingredient, prevents pear powdery mildew (*Podosphaera leucotricha*).

EXAMPLE 114

| | Percent |
|---|---|
| 5,6 - dichloro-2-carboxyamino-1-benzimidazole carboxylic acid, dimethyl ester | 75.0 |
| Alkyl naphthalene sulfonic acid, Na salt | 1.0 |
| Sodium lignin sulfonate | 1.0 |
| Diatomaceous silica | 23.0 |

This wettable powder is dispersed in water at a concentration of 0.2% active ingredient. This composition when sprayed on apple trees prevents apple scab (*Venturia inaequalis*).

EXAMPLE 115

| | Percent |
|---|---|
| 5,6-dichloro-2-carboxyamino-1-benzimidazole carboxylic acid, dimethyl ester | 20 |
| Pyrophyllite | 80 |

The above dust composition, when dusted on apple trees at the rate of 10 pounds of active ingredient per acre, prevents apple scab (*Venturia inaequalis*).

EXAMPLE 116

| | Percent |
|---|---|
| 5,6-dichloro-2-imino-1,3-benzimidazoline dicarboxylic acid, dimethyl ester | 75 |
| Sodium lauryl sulfate | 0.5 |
| Methyl cellulose | 0.25 |
| Diatomaceous silica | 24.25 |

This wettable powder, 0.2% conc. active in water, when sprayed on grapes prevents powdery mildew (*Uncinula necator*).

EXAMPLE 117

The following compound is formulated into a wettable powder with the following ingredients:

| | Percent |
|---|---|
| 4-methyl-1-n-amyloxycarbonyl-2-benzimidazole carbamic acid, tert. butyl ester | 50.0 |
| Alkyl naphthalene sulfonic acid, Na salt | 0.75 |
| Low viscosity methyl cellulose | 0.25 |
| Kaolin clay | 49.0 |

This wettable powder, when dispersed in water at a concentration of two pounds per 100 gallons of water and sprayed on cucumber foliage at the rate of 100 gallons per acre, prevents powdery mildew (*Erysiphe cichoracearum*).

EXAMPLE 118

The following compound is formulated as a dust that is suitable for application by means of conventional dusting equipment by blending the listed ingredients together and passing them through a micropulverizer.

| | Percent |
|---|---|
| 2-imino-1,3-benzimidazoline dicarboxylic acid, di-beta-chloro-ethyl ester | 25 |
| Pyrophyllite | 75 |

This fungicidal composition, when dusted on tomato plants at a rate of 3 pounds per acre of active ingredient prevents infection by early blight (*Alternaria solani*).

EXAMPLE 119

The following wettable powder when dispersed in water at a concentration of 2 pounds per 100 gallons of water and sprayed on tomato foliage at a rate of 100 gallons per acre, prevents early blight (*Alternaria solani*).

| | Percent |
|---|---|
| 2-imino-1,3-benzimidazoline dicarboxylic acid, diallyl ester | 80 |
| Oleic acid ester of sodium isethionate | 0.75 |
| Low viscosity methyl cellulose | 0.25 |
| Silica | 19.00 |

EXAMPLE 120

The following wettable powder when dispersed in water at a concentration of 2 pounds per 100 gallons of water and sprayed on tomato foliage at a rate of 100 gallons per acre, prevents early blight (*Alternaria solani*).

| | Percent |
|---|---|
| 1-isopropoxycarbonyl - 2 - benzimidazole carbamic acid, methyl ester | 80 |
| Oleic acid ester of sodium isethionate | 0.75 |
| Low viscosity methyl cellulose | 0.25 |
| Silica | 19.00 |

EXAMPLE 121

4,5,6 - tribromo-2-imino-1,3-benzimidazoline dicarboxylic acid, di-methyl ester, applied to tomato foliage as an aqueous dispersion at a concentration of 0.2%, prevents infection by the early blight fungus (*Alternaria solani*).

EXAMPLE 122

| | Percent |
|---|---|
| 1-carboxyamino-2-benzimidazole carbamic acid, dimethyl ester | 31.58 |
| Isoparaffin oil (Soltrol 130) | 40.42 |
| Low viscosity white mineral oil | 20.00 |
| Mixture of 3 parts polyoxyethylene fatty amine with 1 part of polyoxyethylene sorbitol septaoleate (Atlas G–2090) | 8.00 |

The components are mixed together and milled in a pebble or sand mill until the active is substantially all below 5 microns. The resulting oil suspension is dispersed in water and sprayed.

A 0.2% active dispersion of this formulation in water prevents the pear scab fungus (*Venturia pyrina*) when sprayed on pear trees.

I claim:

A compound represented by the formula wherein X is selected from the group consisting of hydrogen, halogen, nitro, alkyl groups of 1 through 6 carbon atoms and alkoxy groups of 1 through 6 carbon atoms; Y is selected from the group consisting of hydrogen, chlorine, methyl and ethyl; $n$ is a whole positive integer less than 5; the Q's are selected from the group consisting of hydrogen, —COOR, —COOR', —COOR" and M, with the proviso that not more than one Q is M and at least two Q's are alkoxy carbonyl groups; M is a cation that forms a salt or chelate with the ester molecule; and R, R' and R" are radicals selected from the group consisting of methyl, ethyl, beta-chloroethyl, hydroxyethyl, propyl, butyl, isopropyl, amyl, n-hexyl, vinyl, allyl, butenyl and propargyl.

2. 1-methoxycarbonyl-2-benzimidazole carbamic acid, methyl ester.

3. 1-methoxycarbonyl-2-benzimidazole carbamic acid, ethyl ester.

4. 1-ethoxycarbonyl-2-benzimidazole carbamic acid, methyl ester.

5. 1-ethoxycarbonyl-2-benzimidazole carbamic acid, ethyl ester.

No references cited.